United States Patent
Sundman et al.

(10) Patent No.: US 11,490,332 B2
(45) Date of Patent: Nov. 1, 2022

(54) MULTIPLEXING OF WAKE-UP SIGNALS

(71) Applicant: Telefonaktiebolaget LM Ericsson (publ), Stockholm (SE)

(72) Inventors: Dennis Sundman, Sollentuna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 17/257,717

(22) PCT Filed: Jul. 12, 2018

(86) PCT No.: PCT/EP2018/069034
§ 371 (c)(1),
(2) Date: Jan. 4, 2021

(87) PCT Pub. No.: WO2020/011365
PCT Pub. Date: Jan. 16, 2020

(65) Prior Publication Data
US 2021/0297950 A1 Sep. 23, 2021

(51) Int. Cl.
*H04W 52/02* (2009.01)
*H04W 74/08* (2009.01)

(52) U.S. Cl.
CPC ... *H04W 52/0219* (2013.01); *H04W 52/0229* (2013.01); *H04W 74/0808* (2013.01)

(58) Field of Classification Search
None
See application file for complete search history.

(56) References Cited

U.S. PATENT DOCUMENTS

| | | |
|---|---|---|
| 7,769,094 B2 | 8/2010 | Wilhelmsson |
| 2006/0198335 A1 | 9/2006 | Reunamaki et al. |
| 2018/0020501 A1 | 1/2018 | Aboul-Magd et al. |
| 2018/0063824 A1 | 3/2018 | Kim et al. |
| 2018/0184379 A1 | 6/2018 | Liu et al. |

OTHER PUBLICATIONS

Park, Eunsung (LG Electronics), Performance Investigation on Partial OOK Follow-up; IEEE 802.11-18/0422r2, IEEE mentor, Mar. 5, 2018.

(Continued)

*Primary Examiner* — Hong Shao
(74) *Attorney, Agent, or Firm* — Coats & Bennett, PLLC

(57) ABSTRACT

A method of wirelessly providing a multiplexed wake-up packet for waking up a plurality of wireless communication receivers from a low-power state to a normal state is provided. The multiplexed wake-up packet comprises a composite of individual wake-up packets, wherein each individual wake-up packet is addressed to one of the plurality of wireless communication receivers. The method comprises determining a number N of individual wake-up packets of the multiplexed wake-up packet, determining a time offset $T_o(n)$ for each of the individual wake-up packets, where n=1 ... N, generating the multiplexed wake-up packet as a time domain multiplexed signal comprising all the N individual wake-up packets with the time offsets $T_o(n)$, and transmitting the multiplexed wake-up packet. A network node is arranged to perform the method.

17 Claims, 3 Drawing Sheets

(56) References Cited

OTHER PUBLICATIONS

Huawei, et al., Feature lead summary of Wake-up signal configurations and procedures in NB-IoT, 3GP TSG RAN WG1 Meeting #93, Busan, Korea, May 21-25, 2018, R1-1807471.
Suh, J. et al., "Blank GI for the Waveform Coding", May 8, 2017, pp. 1-8, IEEE 802.11-17/0696r0, IEEE.
Sundman, D. et al., "WUR 128 US Preamble Design", Nov. 6, 2017, pp. 1-11, IEEE 802.11-17/1665r3, IEEE.
Wilhelmsson, L. et al., "Partial OOK—Generalizing the Blank GI Idea", Nov. 6, 2017, pp. 1-25, IEEE 802.11-17/1673r1, IEEE.
Hsu, F. et al., "LP WUR Wake-up Packet Identity Considerations", Mar. 1, 2016, pp. 1-9, IEEE 802.11-16/0402r0, IEEE.
ETSI, "Wideband Transmission Systems; Data Transmission Equipment Operating in the 2,4 GHz ISM Band and Using Wide Band Modulation Techniques; Harmonised Standard Covering the Essential Requirements of Article 3.2 of Directive 2014/53/EU", Harmonised European Standard, ETSI EN 300 328 V2.1.1, Nov. 1, 2016, pp. 1-101, ETSI.
Sundman, D. et al., "Partial On-Off Keying—A Simple Means to Further Improve IoT Performance", 2018 Global Internet of Things Summit (GIoTS), Jun. 4, 2018, pp. 1-5, IEEE.

Traditional OFDM transmission

Traditional on/off keying transmission

Traditional on/off keying with traditional guard intervals

Traditional OFDM transmission

Traditional on/off keying transmission

Traditional on/off keying with traditional guard intervals

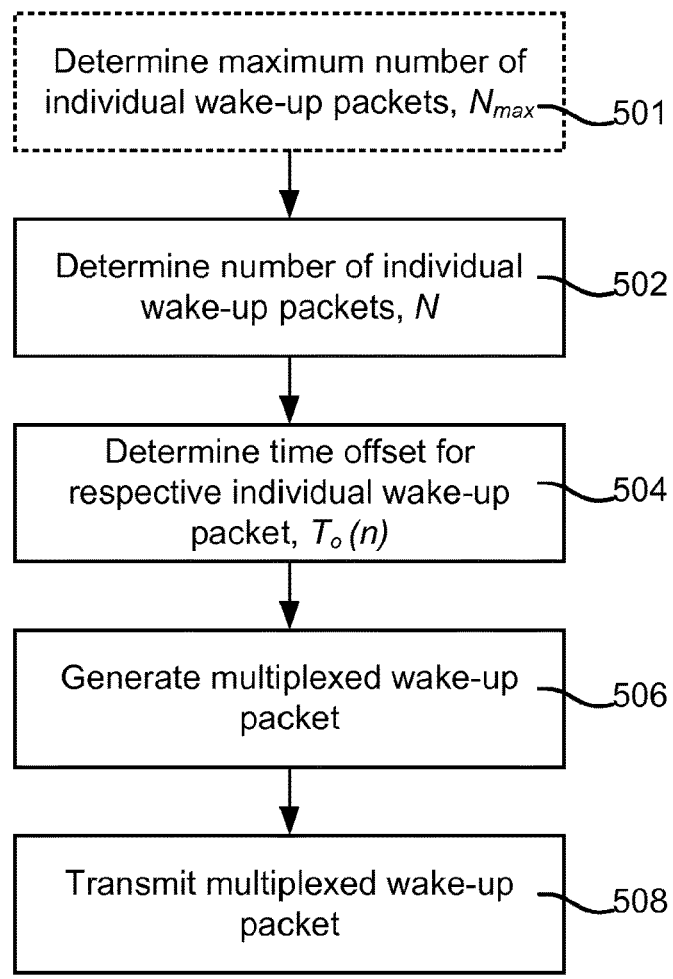
FIG. 5
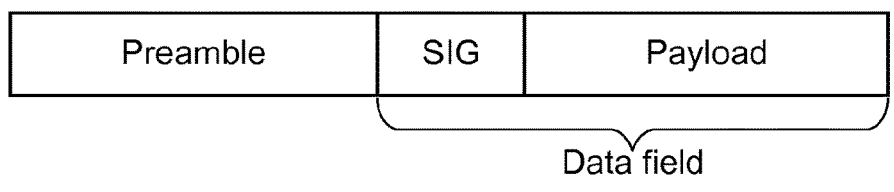
FIG. 6
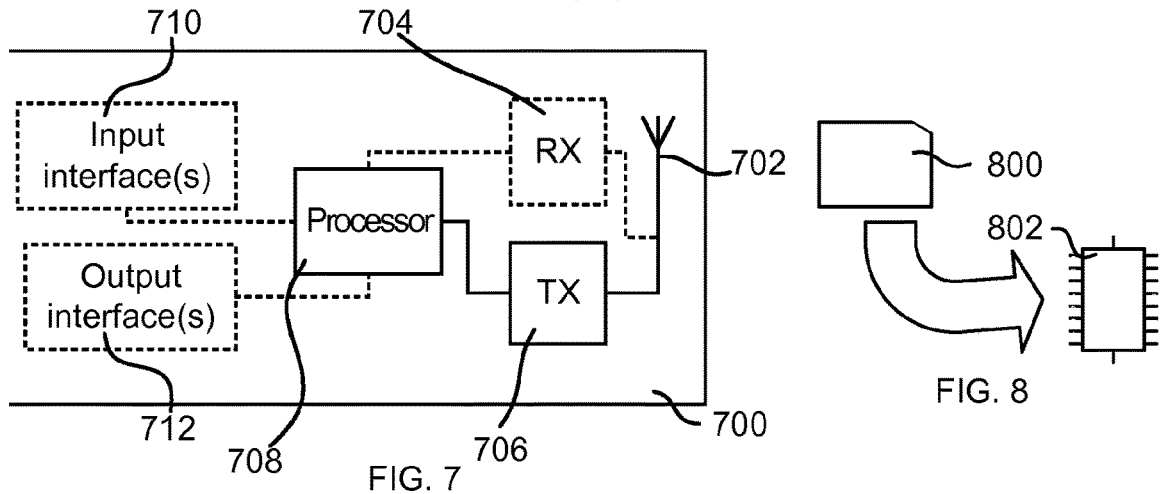
FIG. 7
FIG. 8

MULTIPLEXING OF WAKE-UP SIGNALS

TECHNICAL FIELD

The present invention generally relates to provision of wake-up signals. In particular, the present invention relates to multiplexing wake-up signals to individually address multiple wireless devices within a wake-up packet.

BACKGROUND

Wake-up radio is a technology for enabling low-energy operation of wireless devices. The technology may for example be used in a Wireless Local Area Network (WLAN) or other wireless communication solution, where use of an on/off keying (OOK) modulation scheme together with Manchester coding is contemplated for Wake-Up Radio (WUR) solution where a Wake-Up Signal (WUS) is provided. In this context, there may for example be at least be two rates, e.g. 62.5 kbps and 250 kbps, for the WUS. A reason for using OOK is that it may be demodulated using an envelope detector, which can be implemented at very low complexity.

The signal may have a guard interval before an "on" period when using on/off keying. The benefit with this is that the power of the "on" period may be raised since the allowed power is calculated over a certain time. Put shortly, if the same energy of the signal can be sent in shorter time, and thereby also received in shorter time, the received signal used for demodulation will contain less noise energy and consequently the signal-to-noise-ratio of the signal will be improved. There may also be other reasons for appending a guard interval. Some ways of achieving this are presented in contributions IEEE 802.11-17/1673r1, with title "Partial OOK—Generalizing the Blank GI Idea", and IEEE 802.11-17/1665r3, with title "WUR 128 us Preamble Design".

Applying the technologies discussed above implies that "silent" parts are not used for transmission, which in turn leads to decreased spectrum efficiency.

As low-energy entities relying on wake-up radio technology are expected to be numerous in the future, there is a desire to keep spectrum efficiency decent.

The above information disclosed in this Background section is only for enhancement of understanding of the background of the invention and therefore it may contain information that does not form the prior art that is already known to a person of ordinary skill in the art.

SUMMARY

The invention is based on the understanding that multiplexing of wake-up signals individually addressing wireless devices may be multiplexed into a wake-up packet, wherein spectrum efficiency is increased compared with a legacy approach where each wake-up signal is provided in a packet of its own.

According to a first aspect, there is provided a method of wirelessly providing a multiplexed wake-up packet for waking up a plurality of wireless communication receivers from a low-power state to a normal state, the multiplexed wake-up packet comprising a composite of individual wake-up packets, wherein each wake-up packet is addressed to one of the plurality of wireless communication receivers. The method comprises determining a number N of individual wake-up packets of the multiplexed wake-up packet, determining a time offset $T_o(n)$ for each of the individual wake-up packets, where n=1 . . . N, generating the multiplexed wake-up packet as a time domain multiplexed signal comprising all the N individual wake-up packets with the time offsets $T_o(n)$, and transmitting the multiplexed wake-up packet.

The wake-up packets may comprise signals which are amplitude shift keying signals. The signals may be modulated according to a partial On-Off-Keying, P-OOK, scheme. The P-OOK scheme may include Manchester coding.

A maximal number $N_{max}$ of individual wake-up packets of the multiplexed wake-up packet may be determined from a length of a wake-up symbol $T_b$ of the multiplexed wake-up packet and a length of an assigned symbol part $T_{NZ}$ for each individual wake-up packet to be a greatest integer less than or equal to a relation $T_b/T_{NZ}$, and the determining of the number N of individual wake-up packets of the multiplexed wake-up packet may be made such that $N \leq N_{max}$. Alternatively, where the generating of the multiplexed wake-up packet includes inserting guard intervals between the individual wake-up packets, a maximal number $N_{max}$ of wake-up signals of the wake-up packet may be determined from a length of the wake-up symbol $T_b$ and the length of the assigned symbol part $T_{NZ}$ plus a length of the guard interval d to be a greatest integer less than or equal to a relation $T_b/(T_{NZ}+d)$, and the determining of the number N of individual wake-up packets of the multiplexed wake-up packet may be made such that $N \leq N_{max}$.

The multiplexed wake-up packet may be provided in a data field, the data field comprising a signal field and a payload field and is provided after a preamble, of a transmission employed according to a listen-before-talk, LBT, approach on a wireless medium. The signal field may comprise a unique indicator for each of the addressable wireless communication receivers.

According to a second aspect, there is provided a network node of a wireless communication system. The network node is arranged to wirelessly provide a multiplexed wake-up packet for waking up a plurality of wireless communication receivers from a low-power state to a normal state, the multiplexed wake-up packet comprising a composite of individual wake-up packets, wherein each individual wake-up packet is addressed to one of the plurality of wireless communication receivers. The network node comprises a communication controller arranged to determine a number N of individual wake-up packets of the multiplexed wake-up packet, determine a time offset $T_o(n)$ for each of the individual wake-up packets, where n=1 . . . N, and generate the multiplexed wake-up packet as a time domain multiplexed signal comprising all the N individual wake-up packets with the time offsets $T_o(n)$, and a transmitter arranged to transmit the multiplexed wake-up packet.

The individual wake-up packets may comprise signals which are amplitude shift keying signals. The individual wake-up packets may be modulated according to a partial On-Off-Keying, P-OOK, scheme. The P-OOK scheme may include Manchester coding.

The communication controller may be arranged to determine a maximal number $N_{max}$ of individual wake-up packets of the multiplexed wake-up packet from a length of a wake-up symbol $T_b$ of the multiplexed wake-up packet and a length of an assigned symbol part $T_{NZ}$ for each individual wake-up packet to be a greatest integer less than or equal to a relation $T_b/T_{NZ}$, and the determination of the number N of individual wake-up packets of the multiplexed wake-up packet may be made such that $N \leq N_{max}$. Alternatively, the generation of the multiplexed wake-up packet may include insertion of guard intervals between the individual wake-up packets, and the communication controller may be arranged to determine a maximal number $N_{max}$ of individual wake-up packets of the multiplexed wake-up packet from the length of the wake-up symbol $T_b$ and the length of the assigned symbol part $T_{NZ}$ plus a length of the guard interval d to be a greatest integer less than or equal to a relation $T_b/(T_{NZ}+d)$, and the determination of the number N of individual wake-up packets of the multiplexed wake-up packet may be made such that $N \leq N_{max}$.

The multiplexed wake-up packet may be provided in a data field, the data field comprising a signal field and a payload field and may be provided after a preamble, of a transmission employed according to a listen-before-talk, LBT, approach on a wireless medium. The signal field may comprise a unique indicator for each of the addressable wireless communication receivers.

According to a third aspect, there is provided a computer program comprising instructions which, when executed on a processor of a network node, causes the network node to perform the method according to the first aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 5 is a flow chart illustrating a method according to an embodiment.

FIG. 6 schematically illustrates a format suitable for wake-up signals.

FIG. 7 is a block diagram schematically illustrating a network node according to an embodiment.

FIG. 8 schematically illustrates a computer-readable medium and a processing device.

DETAILED DESCRIPTION

Figure 1:
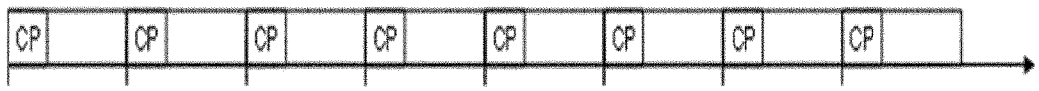
FIG. 1 schematically illustrates on/off keying (OOK) in relation to traditional OFDM and OOK transmissions.
Figure 1:
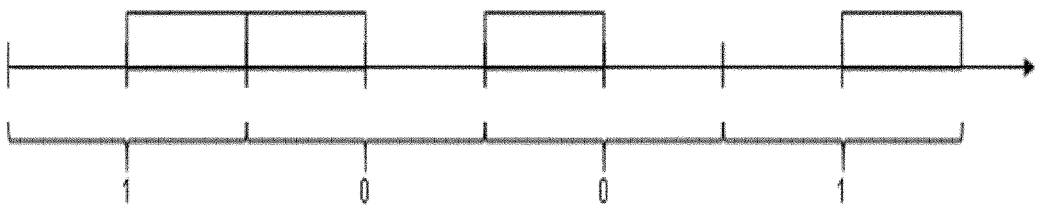
Figure 1:
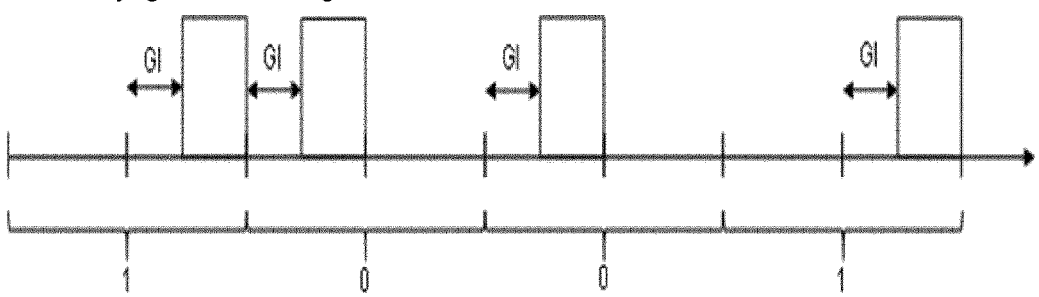

FIG. 1 schematically illustrates an example of on/off keying (OOK) in relation to traditional Orthogonal Frequency Division Multiplex (OFDM) and OOK transmissions. The upper signal diagram of FIG. 1 illustrates traditional OFDM transmission which e.g. is supposed to be used by a main transceiver together with which the WUR is intended to operate. Below that, a signal diagram for a traditional OOK transmission, which in this example uses Manchester coding, aligned with the OFDM symbol rate is provided. The further lower signal diagram illustrates an OOK transmission where a guard interval (GI) is applied for the ON-parts.

The approach has been referred to as Partial OOK in provisional patent applications filed in the United States of America (U.S. 62/574,464, U.S. 62/581,297, and U.S. 62/581,245), which are incorporated by reference in their entirety. Here, the terminology $T_Z$ ("time zero") is used for the part of the signal which is used as the GI, while the active part, i.e. signal is actively high or low to distinguish between symbol values, is referred to as $T_{NZ}$ ("time non-zero"). A time, $T_b$, for a symbol representing e.g. one or more bits is thus $T_b = T_Z + T_{NZ}$.

Figure 2:
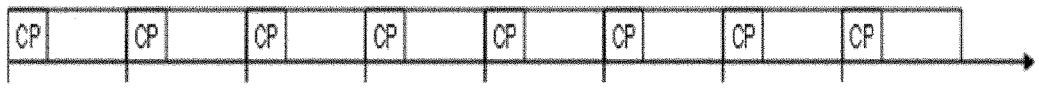
FIG. 2 schematically illustrates OOK with guard intervals in relation to traditional OFDM and OOK transmissions.
Figure 2:
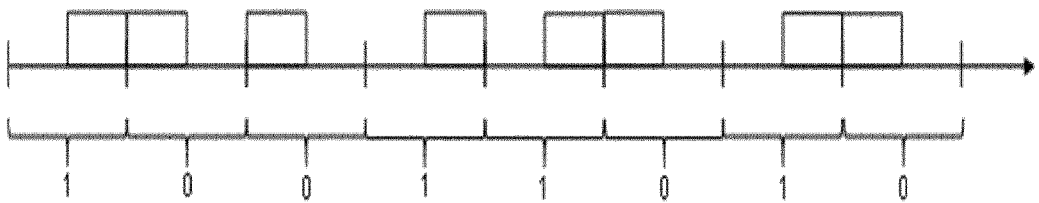
Figure 2:
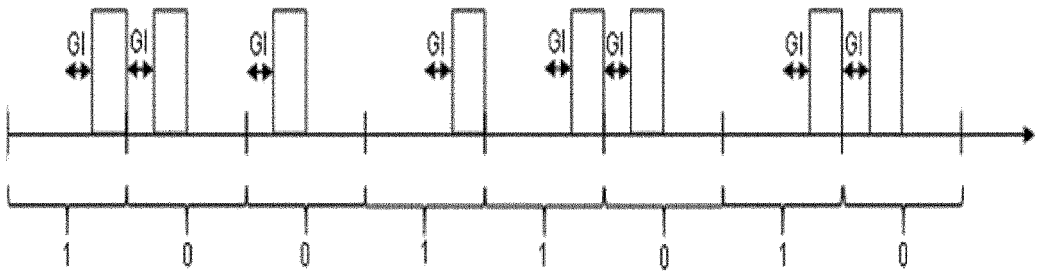

FIG. 2 schematically illustrates the traditional OOK with an example of guard intervals in relation to traditional OFDM and OOK transmissions. Similar to FIG. 1, the upper signal diagram of FIG. 2 illustrates traditional OFDM transmission which e.g. is supposed to be used by a main transceiver together with which the WUR is intended to operate. Below that, a signal diagram for a traditional OOK transmission, which in this example uses Manchester coding, aligned with the OFDM symbol rate is provided. The further lower signal diagram illustrates an OOK transmission where a GI is applied for the ON-parts. Furthermore, the rates of the OOK signal are here higher compared with that of FIG. 1 such that one OOK symbol is provided per OFDM symbol time instead of one OOK symbol every other OFDM symbol time as provided in FIG. 1.

Pulse position modulation (PPM), is a modulation technique where information is transmitted by transmitting a pulse at different locations in time. OOK with Manchester coding can therefore also be viewed as a PPM scheme. This becomes particularly evident when the GI is introduced for the ON-part of the OOK with Manchester coding. In this disclosure, the modulation is considered as OOK, although it could also be explained from the viewpoint of PPM.

Figure 3:
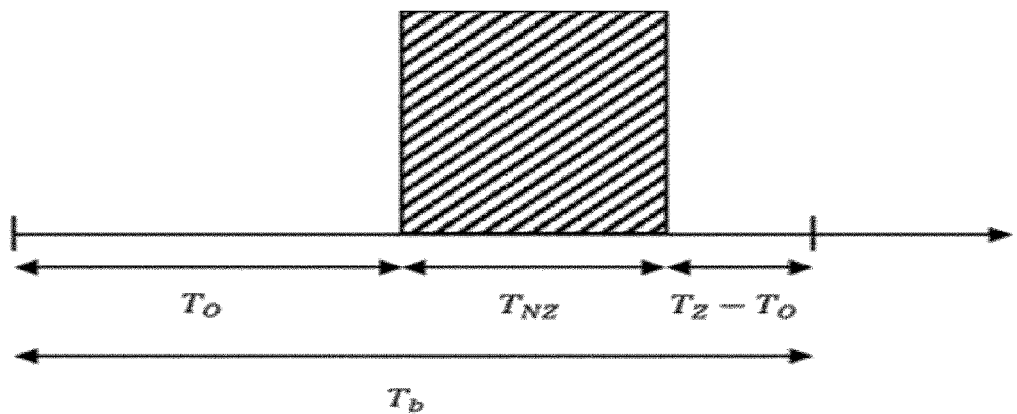
FIG. 3 schematically illustrates partial OOK.

As $T_{NZ}$ becomes smaller and $T_Z$ larger, less time of the channel will be used for transmitting data. As the channel is not used for transmission data all the time, spectrum efficiency can be considered as low. To improve spectrum efficiency, it is here proposed to use the $T_Z$ part for multiplexing several wake-up packets, each wake-up packet being associated with an individual receiving entity, such that a multiplexed wake-up packet comprising individual wake-up packets is formed. This is possible whenever time relations are $T_Z \geq T_{NZ}$. How many signals that can be multiplexed is dependent on the specific numerology used. FIG. 3 schematically illustrates definitions of numerology for partial OOK with a time offset $T_O$. Please note that in FIG. 3, no Manchester coding is applied for the sake of easier demonstration of the principles, but Manchester coding is equally feasible under the demonstrated principles. Thus, the bit time $T_b$ is $T_b = T_O + T_{NZ} + T_Z - T_O$ (i.e. the definition is the same as above but with introduction of $T_O$).

Figure 4:
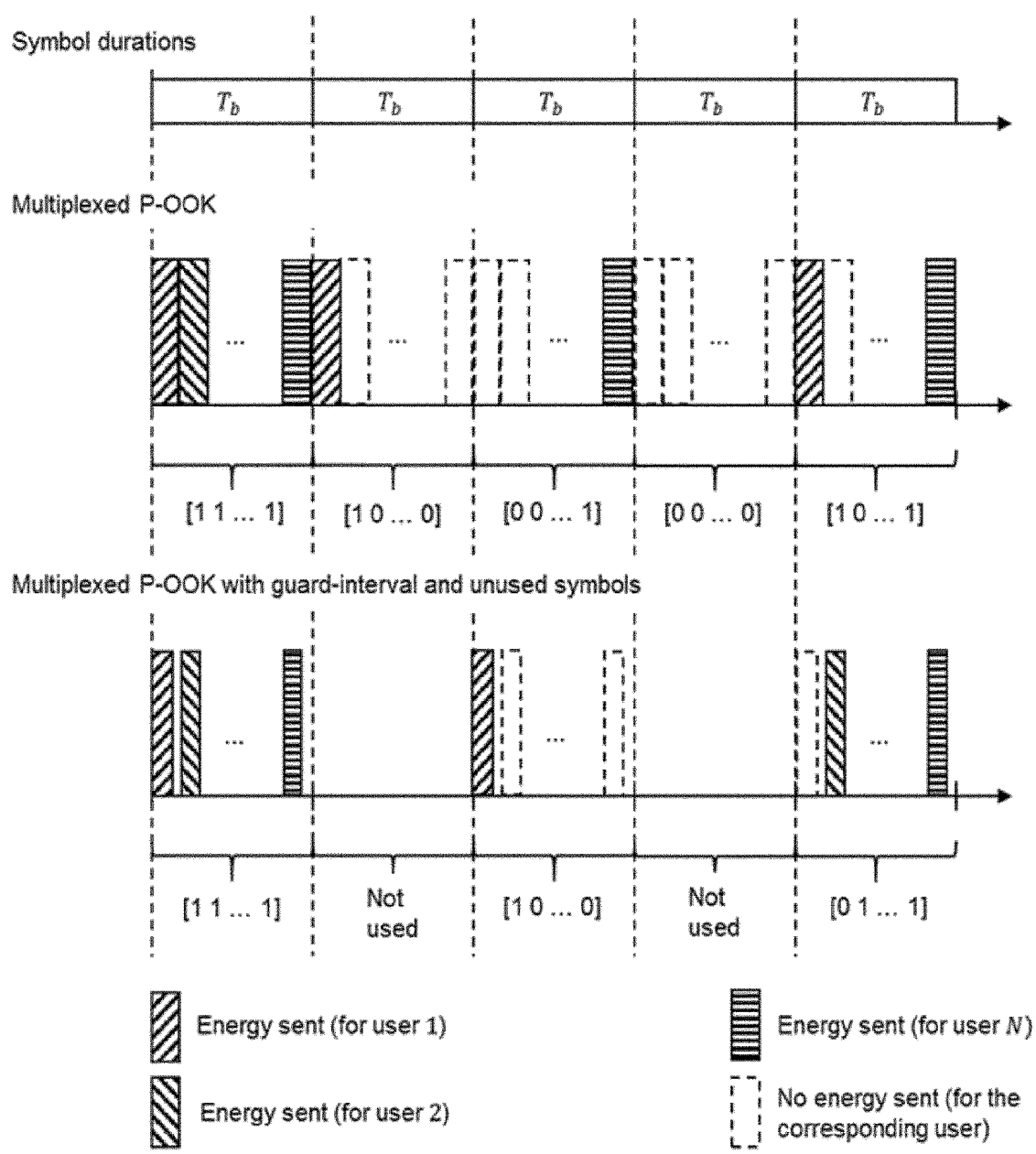
FIG. 4 schematically illustrates multiplexing of wake-up signals.

With the introduction of the time offset $T_O$, which is assigned differently for different individual wake-up packets, a plurality of individual wake-up packet symbols can be multiplexed into the symbol duration $T_b$ of the multiplexed wake-up packet. FIG. 4 schematically illustrates multiplexing of wake-up signals by applying this principle. The upper part marks the earlier defined symbol time $T_b$, next multiplexed symbols by applying different offsets are illustrated, and below that multiplexed symbols including GIs adapted for the presented approach and using different offsets are illustrated. In the lower signal diagram, the optional feature of letting some symbol times be unused, which will be further discussed below.

From the illustrated upper multiplexing diagram of FIG. 4, it can be observed that individual wake-up packet indexed n addressing WUR n is e.g. given timing offset $T_O = nT_{NZ}$. From the illustrated lower multiplexing diagram of FIG. 4, it can be observed that individual wake-up packet indexed n addressing WUR n is e.g. given timing offset $T_O = n(T_{NZ}+d)$, where d is the duration of the GI. A reason for introducing a GI is to reduce inter-symbol interference. A reason for introducing some unused symbol times is to limit average power output in relation to a given power for the signal of respective individual wake-up packet. If no such considerations need to be taken, all symbol times may be used if needed.

Considering the diagrams demonstrated above, N WURs may be addressed in one symbol time $T_b$, that is, n is 0, . . . , N−1 for the examples given above. The maximum number $N_{max}$ of WURs addressable per symbol time $T_b$ depends on the symbol time $T_b$, and the time each WUR needs, i.e. $T_{NZ}$ or $T_{NZ}+d$ as demonstrated above.

The selection of one or more of the parameters demonstrated above, i.e. $T_b$, $T_{NZ}$, $T_Z$, d, N, $N_{max}$, etc. may be done at design and implementation, or may be fixed by specifications of the used system or standard. For example, $T_b$ and $T_{NZ}$ may be fixed by a standard, and the design aims at handling a certain $N_{max}$, wherein the designer needs to choose d to make a proper implementation. Or the designer chooses d based on investigations on expected inter-symbol interference, and then determines a feasible $N_{max}$. The design may also include rules for dynamically selecting some of the parameters, e.g. dynamically setting d based on experienced inter-symbol interference, dynamically setting/reducing $N_{max}$ based on constraints on average power output, etc.

FIG. 5 is a flow chart illustrating a method according to embodiments. The method relates to wirelessly providing a multiplexed wake-up packet for waking up a plurality of WURs from a low-power state to a normal state. The multiplexed wake-up packet comprises a composite of individual wake-up packets. Each individual wake-up packet is addressed to one of the plurality of wireless communication receivers which are equipped with a WUR arranged to wake up a main transceiver of the wireless communication receiver upon detection of the proper individual wake-up packet. The method is for example performed in an access point or other network node serving the wireless communication receivers, but may also be performed in any station which has a task of initiating communication with any of the wireless communication receivers. For the sake of easier understanding of this disclosure, the unit performing the method will hereafter be called "entity". The entity determines 502 a number N of individual wake-up packets of the multiplexed wake-up packet, determines 504 a time offset $T_o(n)$ for each of the individual wake-up packets, where n=1 . . . N. The respective determination 502, 504 may be made dynamically, e.g. based on rules and/or look-up tables, or be fixed from design or settings. The entity then generates 506 the multiplexed wake-up packet as a time domain multiplexed signal comprising all the N individual wake-up packets with the time offsets $T_o(n)$ and transmits 508 the multiplexed wake-up packet.

The individual wake-up packets may comprise signals which are amplitude shift keying signals, e.g. modulated according to an On-Off-Keying, OOK, scheme, as discussed above. The OOK scheme may include Manchester coding.

A maximal number $N_{max}$ of individual wake-up packets of the multiplexed wake-up packet may be determined 501 by the entity. For example, the determination 501 may be made from a length of the symbol $T_b$ of the multiplexed wake-up packet and a length of an individual wake-up packet $T_{NZ}$, wherein $N_{max}$ is determined 501 to be a greatest integer less than or equal to a relation $T_b/T_{NZ}$, wherein the determining 502 of the number N of individual wake-up packets of the multiplexed wake-up packet is made such that $N \leq N_{max}$.

The generating 506 of the multiplexed wake-up packet may include inserting guard intervals between the individual wake-up packets. The determining 501 of the maximal number $N_{max}$ of individual wake-up packets of the multiplexed wake-up packet is then of course affected. $N_{max}$ may then be determined 501 from a length of the multiplexed wake-up packet $T_b$ and a length of an individual wake-up packet $T_{NZ}$ plus a length of the guard interval d to be a greatest integer less than or equal to a relation $T_b/(T_{NZ}+d)$, wherein the determining 502 of the number N of individual wake-up packets of the multiplexed wake-up packet is made such that $N \leq N_{max}$.

The multiplexed wake-up packet may be provided in a data field, e.g. as demonstrated above where the data field comprises a signalling field and a payload field and is provided after a preamble, for example of a transmission employed according to a listen-before-talk, LBT, approach on a wireless medium. The signalling field may comprise a unique indicator for each of the addressable wireless communication receivers, which in some system is referred to as a colour bit aiming to address medium contention for units operating with the same medium access characteristics, such as frequency, modulation scheme, etc.

FIG. 6 schematically illustrates a transmission format commonly used for e.g. WLANs and which is suitable for modifying to provide the wake-up signals. The format includes a preamble and a data field. The data field comprises a signalling part, SIG, and a payload part. The preamble may comprise signals enabling a receiver to detect presence of the signal, perform synchronisation, channel estimations, etc. The signalling part may comprise header information, indication on data rate, etc. The payload part then comprises the actual data transmission. For the application of the approach demonstrated herein, the signalling part SIG is instead used for providing the multiplexed wake-up packet.

The approach presented here is equally feasible for other types of formats.

FIG. 7 is a block diagram schematically illustrating a network node 700 according to an embodiment. The network node comprises an antenna arrangement 702, an optional receiver 704 connected to the antenna arrangement 702, a transmitter 706 connected to the antenna arrangement 702, a processing element 708 which may comprise one or more circuits, and one or more optional input interfaces 710 and one or more optional output interfaces 712. The interfaces 710, 712 can be operator interfaces and/or signal interfaces, e.g. electrical or optical. The network node 700 is arranged to provide wake-up signals. In particular, by the processing element 708 being arranged to perform the embodiments demonstrated with reference to FIGS. 1 to 6, the network node 700 is capable of addressing multiple wireless devices individually with individual wake-up packets in one multiplexed wake-up packet. The processing element 708 can also fulfill a multitude of tasks, ranging from signal processing to enable reception and transmission since it is connected to the receiver 704 and transmitter 706, executing applications, controlling the interfaces 710, 712, etc.

The methods according to the present invention is suitable for implementation with aid of processing means, such as computers and/or processors, especially for the case where the processing element 708 demonstrated above comprises a processor handling wake-up signal communication control. Therefore, there is provided computer programs, comprising instructions arranged to cause the processing means, processor, or computer to perform the steps of any of the methods according to any of the embodiments described with reference to FIG. 1 to 6. The computer programs preferably comprise program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIGS. 1 to 6. The computer 802 and computer program product 800 can be arranged to execute the program code sequentially where actions of the any of the methods are performed stepwise, and/or perform the execution on a real-time basis. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

The invention claimed is:

1. A method of wirelessly providing a multiplexed wake-up packet for waking up a plurality of wireless communication receivers from a low-power state to a normal state; the multiplexed wake-up packet comprising a composite of individual wake-up packets;
wherein each individual wake-up packet is addressed to one of the plurality of wireless communication receivers; the method comprising
determining a number N of individual wake-up packets of the multiplexed wake-up packet;
determining a time offset $T_o(n)$ for each of the individual wake-up packets, where n=1 . . . N;
generating the multiplexed wake-up packet as a time domain multiplexed signal comprising all the N individual wake-up packets with the time offsets $T_o(n)$; and
transmitting the multiplexed wake-up packet.

2. The method of claim 1, wherein the individual wake-up packets comprise signals which are amplitude shift keying signals.

3. The method of claim 2, wherein the signals are modulated according to a Partial On-Off-Keying (P-OOK) scheme.

4. The method of claim 3, wherein the P-OOK scheme includes Manchester coding.

5. The method of claim 1:
wherein a maximal number $N_{max}$ of individual wake-up packets of the multiplexed wake-up packet is determined from a length of a wake-up symbol $T_b$ of the multiplexed wake-up packet and a length of an assigned symbol part $T_{NZ}$ for each individual wake-up packet to be a greatest integer less than or equal to a relation $T_b/T_{NZ}$; and
wherein the determining of the number N of individual wake-up packets of the multiplexed wake-up packet is made such that $N \leq N_{max}$.

6. The method of claim 1:
wherein the generating of the multiplexed wake-up packet includes inserting guard intervals between the individual wake-up packets;
wherein a maximal number $N_{max}$ of individual wake-up packets of the multiplexed wake-up packet is determined from a length of a wake-up symbol $T_b$ of the multiplexed wake-up packet and a length of an assigned symbol part $T_{NZ}$ for each individual wake-up packet plus a length of the guard interval d to be a greatest integer less than or equal to a relation $T_b/(T_{NZ}+d)$; and
wherein the determining of the number N of individual wake-up packets of the multiplexed wake-up packet is made such that $N \leq N_{max}$.

7. The method of claim 1:
wherein the multiplexed wake-up packet is provided in a data field of a transmission employed according to a listen-before-talk (LBT) approach on a wireless medium; and
wherein the data field comprises a signal field and a payload field and is provided after a preamble.

8. The method of claim 7, wherein the signal field comprises a unique indicator for each of the addressable wireless communication receivers.

9. A network node of a wireless communication system; the network node being configured to wirelessly provide a multiplexed wake-up packet for waking up a plurality of wireless communication receivers from a low-power state to a normal state; the multiplexed wake-up packet comprising a composite of individual wake-up packets;
wherein each individual wake-up packet is addressed to one of the plurality of wireless communication receivers; the network node comprising:
processing circuitry;
memory containing instructions executable by the processing circuitry whereby the network node is operative to:
function as a communication controller configured to:
determine a number N of individual wake-up packets of the multiplexed wake-up packet;
determine a time offset $T_o(n)$ for each of the individual wake-up packets, where n=1 . . . N; and
generate the multiplexed wake-up packet as a time domain multiplexed signal comprising all the N individual wake-up packets with the time offsets $T_o(n)$; and
transmit the multiplexed wake-up packet.

10. The network node of claim 9, wherein the individual wake-up packets comprise signals which are amplitude shift keying signals.

11. The network node of claim 10, wherein the signals are modulated according to an Partial On-Off-Keying (P-OOK) scheme.

12. The network node of claim 11, wherein the P-OOK scheme includes Manchester coding.

13. The network node of claim 9:
wherein the communication controller is configured to determine a maximal number $N_{max}$ of individual wake-up packets of the multiplexed wake-up packet from a length of a symbol of the multiplexed wake-up packet $T_b$ and a length of a symbol part of the individual wake-up packet $T_{NZ}$ to be a greatest integer less than or equal to a relation $T_b/T_{NZ}$; and
wherein the determination of the number N of individual wake-up packets of the multiplexed wake-up packet is made such that $N \leq N_{max}$.

14. The network node of claim 9:
wherein the generation of the multiplexed wake-up packet includes insertion of guard intervals between the individual wake-up packets;
wherein the communication controller is configured to determine a maximal number $N_{max}$ of individual wake-up packets of the multiplexed wake-up packet from a length of a symbol of the wake-up packet $T_b$ and a length of a symbol part of the individual wake-up packet $T_{NZ}$ plus a length of the guard interval d to be a greatest integer less than or equal to a relation $T_b/(T_{NZ}+d)$; and wherein the determination of the number N of individual wake-up packets of the multiplexed wake-up packet is made such that $N \leq N_{max}$.

15. The network node of claim 9:
wherein the multiplexed wake-up packet is provided in a data field of a transmission employed according to a listen-before-talk (LBT) approach on a wireless medium; and
wherein the data field comprises a signal field and a payload field and is provided after a preamble.

16. The network node of claim 15, wherein the signal field comprises a unique indicator for each of the addressable wireless communication receivers.

17. A non-transitory computer readable recording medium storing a computer program product for controlling a network node for wirelessly providing a multiplexed wake-up packet for waking up a plurality of wireless communication receivers from a low-power state to a normal state; the multiplexed wake-up packet comprising a composite of individual wake-up packets; wherein each individual wake-up packet is addressed to one of the plurality of wireless communication receivers; the computer program product comprising program instructions which, when run on processing circuitry of the network node, causes the network node to:
determine a number N of individual wake-up packets of the multiplexed wake-up packet;
determine a time offset $T_o(n)$ for each of the individual wake-up packets, where n=1 . . . N;
generate the multiplexed wake-up packet as a time domain multiplexed signal comprising all the N individual wake-up packets with the time offsets $T_o(n)$; and
transmit the multiplexed wake-up packet.

* * * * *